United States Patent
Amano et al.

(10) Patent No.: US 6,507,127 B1
(45) Date of Patent: Jan. 14, 2003

(54) HYBRID VEHICLE

(75) Inventors: Masahiko Amano, Hitachioota (JP); Ryoso Masaki, Hitachi (JP); Taizo Miyazaki, Hitachi (JP); Tomoyuki Hanyu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 33 days.

(21) Appl. No.: 09/668,170

(22) Filed: Sep. 25, 2000

(30) Foreign Application Priority Data

Sep. 24, 1999 (JP) .......................................... 11-269847

(51) Int. Cl.$^7$ ................................................ H02P 9/04
(52) U.S. Cl. ...................... 290/40 C; 290/40 A; 701/65
(58) Field of Search ............................ 290/40 C, 40 A; 180/65.2, 65.4; 701/22, 65

(56) References Cited

U.S. PATENT DOCUMENTS

| | | | | |
|---|---|---|---|---|
| 5,132,906 A | * | 7/1992 | Sol et al. ..................... | 180/197 |
| 5,319,555 A | * | 6/1994 | Iwaki et al. ................. | 477/120 |
| 5,557,519 A | * | 9/1996 | Morita ........................ | 123/349 |
| 5,778,326 A | * | 7/1998 | Moroto et al. ............. | 180/65.2 |
| 5,832,396 A | * | 11/1998 | Moroto et al. ............. | 180/65.2 |
| 5,832,400 A | * | 11/1998 | Takahashi et al. ........... | 701/22 |
| 5,995,895 A | * | 11/1999 | Watt et al. ................. | 56/10.2 G |
| 6,116,363 A | * | 9/2000 | Frank ......................... | 180/65.2 |
| 6,155,365 A | * | 12/2000 | Boberg ....................... | 180/65.2 |
| 6,166,449 A | * | 12/2000 | Takaoka et al. .......... | 290/40 A |
| 6,209,672 B1 | * | 4/2001 | Severinsky ................ | 180/65.2 |
| 6,298,824 B1 | * | 10/2001 | Suhre .................... | 123/406.49 |

FOREIGN PATENT DOCUMENTS

| | | |
|---|---|---|
| EP | 0 829 389 A2 | 3/1998 |
| JP | 8-126116 | 5/1996 |
| JP | 8-223705 | 8/1996 |
| JP | 9-242862 | 6/1997 |
| JP | 11-8909 | 4/2000 |
| WO | WO97/10966 | 3/1997 |

OTHER PUBLICATIONS

Patent Abstracts of Japan, vol. 1998, No. 1, abstract of Japan 09–242862 Sep. 16, 1997.

* cited by examiner

*Primary Examiner*—Joseph Waks
(74) *Attorney, Agent, or Firm*—Crowell & Moring LLP

(57) ABSTRACT

An altitude calculation unit 44 estimates an inclination of a road from vehicle speed and vehicle drive torque, and calculates altitude of a vehicle. A battery management unit 43 calculate difference between average altitude determined from the past altitude history and the present altitude and varies a target value of battery charging rate or upper and lower limit values thereof in response to the difference. Charging and discharging command value is calculated in response to difference between charging rate detection value and the target value or the upper and lower limit values. An integrated control unit 22 sets output share between an engine and a motor based on vehicle target drive torque calculated by a target toque determination unit 21 and charging and discharging command from the battery management unit 43, determines an optimum operation point of the engine and issues a control command to the engine and the motor. Thereby, even when a travelling route ahead of the vehicle is not set, a possible prevention of regenerative braking due to full charging during downhill rolling is avoided and a fuel economy for a hybrid vehicle is improved in total.

4 Claims, 5 Drawing Sheets

HYBRID VEHICLE

BACKGROUND OF THE INVENTION

1. Field of the Invention

The present invention relates to a hybrid vehicle which is provided with both an engine and an electric motor.

2. Conventional Art

As a driving system for achieving a low fuel cost with an engine, a hybrid vehicle which utilizes a driving force of an electric motor is in use, and a variety of types therefor such as a series type and a parallel type have been proposed.

In the series type hybrid vehicle, driving of the vehicle is performed only by the electric motor and charging of a battery is performed by the engine driven generator. In the parallel type hybrid vehicle, driving of the vehicle is performed by both the engine and the electric motor or one of them. In both types, the electric motor is operated as a electric generator during deceleration and downhill running of the vehicle, and the energy recovered is regenerated to charge the battery.

However, when a downhill running continues long, the battery is almost charge to its full level and the generated energy sometimes can not be used for the charging. Therefore, in view of such cases a method is proposed in which a charging rate of the battery is in advance reduced before a possible downhill running.

JP-A-8-126116 (1996) discloses a method in which a target value of battery charging rate is set based on altitude information at a travelling route to be advanced from the current position by making use of a navigation device.

JP-A-8-223705 (1996) discloses a method in which an energy balance of a battery is in advance calculated in such a case when a travelling route of the vehicle is determined beforehand such as a bus on a regular route, and the motor torque is controlled based on a difference from the estimated predetermined value.

Further, JP-A-11-8909 (1999) discloses a method for a series type hybrid vehicle with no navigation information in which after an inclination of an uphill is estimated according to power consumption of the motor and vehicle speed and energy would be regenerated during downhill running is predicted, a generation start charging rate for the engine driven generator is set.

Among the methods referred to above, the method utilizing the navigation information can not be applied to a vehicle to which no navigation system is installed. Further, even if a navigation system is installed, the travelling route is not always set, therefore, in such cases the method can not be applied. Still further, it is rare for a common vehicle that the travelling route is known in advance as the bus on a regular route, therefore, the method of calculating beforehand the energy balance of a battery generally can not be applied.

Further, the method of estimating the inclination without using navigation information only suggests the setting method of generation start charging rate in a series type hybrid vehicle, therefore, of which method can not be applied to a parallel type hybrid vehicle. Further, it is not necessarily true that after uphill climbing downhill rolling comes, in some cases a running on a flat road follows for a relatively long period, JP-A-11-8909 (1999) fails to disclose a proper battery charging rate control in such cases.

SUMMARY OF THE INVENTION

An object of the present invention is to provide a hybrid vehicle in which regenerative energy to be recovered during downhill rolling can be utilized effectively which is applicable both for the parallel type hybrid vehicle and the series type hybrid vehicle as well as even applicable for a case where no navigation system is installed and a travelling route ahead is unclear.

Another object of the present invention is to provide a hybrid vehicle which can perform a proper control of a target charging rate even in a case where after climbing an uphill no downhill rolling follows for a comparatively long period, and which can prevent such as deterioration of fuel economy and life time reduction of the battery.

As a measure for solving the problems in a hybrid vehicle which comprises an engine which generates driving energy for driving a vehicle; a speed changer which changes revolution speed of the engine and transmits driving force to wheels; an electric motor which increases or decreases driving force of the wheels; a battery which supplies electric power for driving the electric motor as well as is used to be charged by regenerative electric power; and a battery control means which controls a charging rate of the battery, the present invention is further provided with an altitude calculating means which calculates altitude of the vehicle, wherein the battery control means sets a charging rate target value or a charging rate upper limit value based on the calculated altitude.

Further, in such instance, the charging rate target value or the charging rate upper limit value is set based on a difference between an average altitude calculated according to past altitude history and the present altitude of the vehicle.

The altitude calculating means performs the calculation based on information from GPS or information of driving torque and vehicle speed of the vehicle. As the driving torque of the vehicle a driving torque command value is used. Alternatively, the driving torque of the vehicle is estimated from a motor torque.

With these methods, even in a parallel type hybrid vehicle and in a case where no navigation system is installed and a travelling route ahead is unclear, the charging rate target value as well as the charging rate upper limit value of the battery can be varied based on the present and past altitude information, accordingly, regenerative energy recovered during downhill rolling can be effectively stored in the battery.

Further, in a case where after performing an uphill climbing no downhill rolling follows for a comparatively long period, the charge rate target value is gradually returned to the original value depending on the travelling distance, therefore, there never occurs that the charging rate remains low, thereby, the deterioration of fuel economy as well as the battery life time reduction can be prevented.

BRIEF DESCRIPTION OF THE INVENTION

DETAILED DESCRIPTION OF THE EMBODIMENTS

Figure 1:
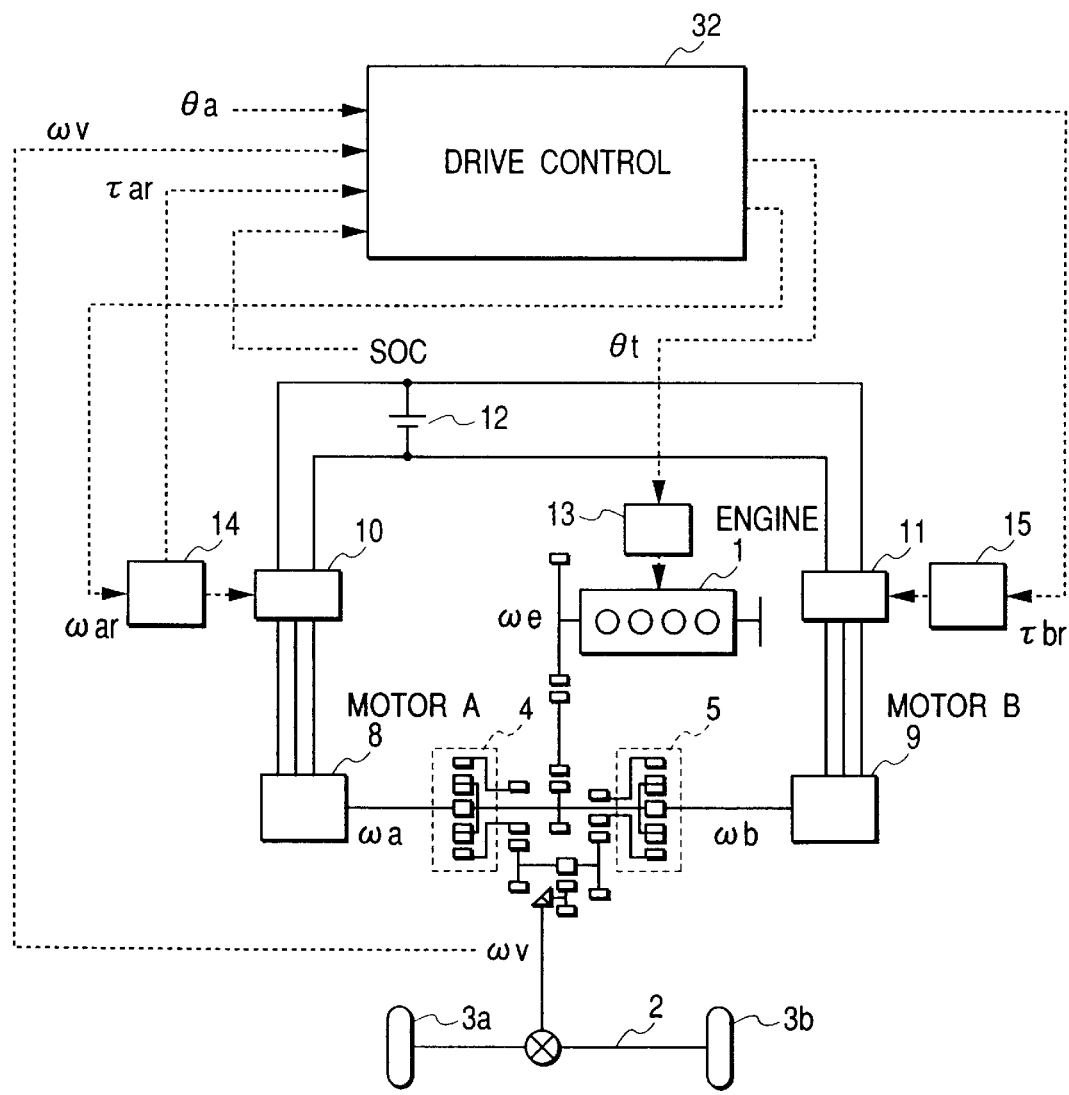
FIG. 1 is a construction diagram of a hybrid vehicle to which the present invention is applied.

FIG. 1 is a hybrid car which uses energy from an engine 1, rotates wheel tires 3a and 3b via a drive shaft 2 and drives a vehicle body.

As a differential mechanism thereof planetary gears 4 and 5 are provided and each is constituted by a sun gear, planet gear and a ring gear. The respective sun gears are driven respectively by a motor A 8 and a motor B 9 which are controlled by electric power converters 10 and 11. A battery 12 is used such as for supplying energy required by these motors and for storing energy generated by the motors when operated as generators. Further, the respective planet gears are connected by a common input shaft and are structured to distribute the driving torque of the engine 1 into the two sets of planetary gears. The respective ring gears are coupled to a common output shaft via respective gears having different gear ratios, the torques outputted from the two sets of planetary gears are composited here to form an output shaft torque τv for driving the vehicle. With the output shaft torque an acceleration and deceleration of the vehicle intended by a driver can be obtained. Further, through control of torques τa and τb and of speed ωa and ωb of the motor A 8 and the motor B 9 which drive the sun gears, the output shaft torque τv and engine revolution speed ωe can be adjusted.

Now, a specific control method of the motor A 8 and the motor B 9 will be explained hereinbelow. In the system as illustrated in FIG. 1, the following equations from formula (1) through formula (4) stand;

$$\omega e = Kp\omega a + Ka\omega v \quad (1)$$

$$\omega e = Kp\omega b + Kb\omega v \quad (2)$$

$$\tau e = (\tau a + \tau b)/Kp \quad (3)$$

$$\tau v = (Ka\tau a + Kb\tau b)/Kp \quad (4)$$

Wherein, ωe, ωv, ωa and ωb represent engine revolution speed, output shaft revolution speed, motor A revolution speed and motor B revolution speed, τe, τa, τb and τv represent engine torque, motor A torque, motor B torque and output shaft torque, and Kp, Ka and Kb are respectively constants representing relations with regard to gear ratio.

By making use of the above relationships and when assuming, for example, a target revolution speed of the engine as ωer, a detection value of the output shaft revolution speed as ωv and a revolution speed set value of the motor A as ωar, the following equation is obtained according to formula (1);

$$\omega ar = (\omega er - Ka\omega v) \quad (5)$$

When the revolution speed of the motor A is controlled based on the above equation, an operation point of the engine can be moved to a desired point to obtain a desired change gear ratio. Further, when assuming a target drive torque for the output shaft as τvr and an output torque of the motor A as τa, the following equation is obtained according to formula (4);

$$\tau br = (Kp\tau vr - Ka\tau a)/Kb \quad (6)$$

When assuming τbr determined according to formula (6) as the torque set value of the motor B, a desired vehicle drive torque is obtained.

Through control of the motors according to formulas (5) and (6), the engine revolution speed is controlled so as to assume a desired change gear ratio as well as a target vehicle drive torque is caused to be generated. Further, since the engine torque τe is not included in formula (6), the vehicle drive torque is controlled along the target value through cooperative control of the two motors even if the engine torque is varied.

A drive control device 32 is for realizing the above control, and, in that, outputs a throttle opening degree command value θt for the engine, a speed command value ωar for the motor A and a torque command value τbr for the motor B, based on information of an acceleration valve opening degree θa, an output shaft revolution speed ωv, a torque command value τar for the motor A and a battery charging rate SOC. The throttle opening degree command value θt is sent to a throttle control unit 13, the motor A speed command value ωar is sent to a motor A control device 14 and the motor B torque command value τbr is sent to a motor B control device 15 respectively, thereby, the engine as well as the motors are specifically controlled.

The motor A control device 14 prepares the torque command value τar based on difference between the speed command value ωar and the speed detection value ωa through proportional plus integral control so as to reduce the difference and controls an electric power converter 10. Further, the torque command value τar is also sent to the drive control device 32.

Figure 2:
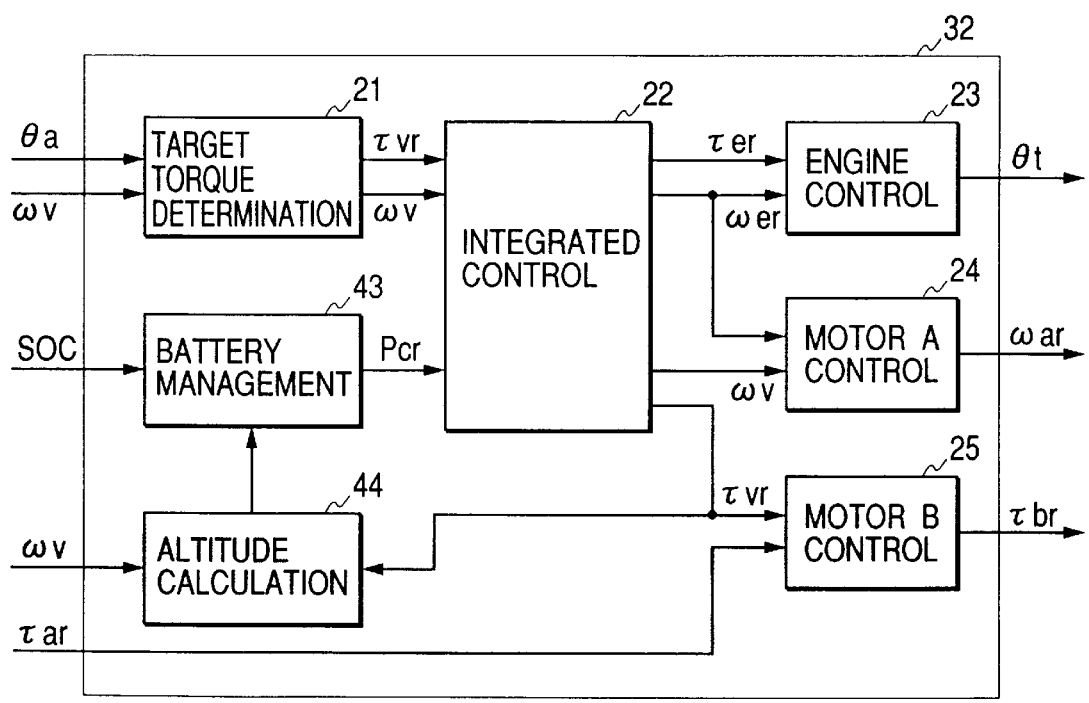
FIG. 2 is a construction diagram of a drive control device in the present invention.

Now, the structure of the drive control device 32 will be explained with reference to FIG. 2.

At first a target drive torque determination unit 21 determines a target drive torque τvr of the output shaft based on an acceleration valve opening degree θa and a vehicle speed ωv with reference to a predetermined map information.

An integrated control unit 22 determines an engine output and a change gear ratio based on a target drive torque τvr, an output shaft revolution speed ωv and a charge-discharge command Pcr from a battery management unit 43, and calculates an operation point (a target revolution speed ωer and a target torque τer) of the engine. In the calculation, the operation point is determined in such a manner that the engine is operated in a region having a desired efficiency as much as possible.

An engine control unit 23 determines a throttle opening degree command value θt depending on the engine target revolution speed ωer and the target torque τer determined by the integrated control unit 22.

A motor A control unit 24 calculates a speed command value ωar according to formula (5) based on the engine target revolution speed ωer determined by the integrated control unit 22 and the measured value ωv of the output shaft revolution speed, and provides a speed command to the motor A control device 14.

A motor B control unit 25 calculates a torque command value τbr of the motor B based on the target drive torque τvr of the output shaft transmitted from the integrated control unit 22 and the torque command value τar for the motor A 8 by substituting τar for τa in formula (6) and provides a command to the motor B control device 15.

An altitude calculation unit 44 estimates an inclination of the road now travelling based on the output shaft revolution speed ωv and the output shaft target drive torque τvr and calculates the altitude. The inclination estimation method and the altitude calculation method will be explained later.

A battery management unit 43 determines a target value of battery charging rate and upper and lower limit values thereof, calculates a charge-discharge command value Pcr depending on a difference of the target value from the battery charging rate detection value SOC and sends the same to the integrated control unit 22. A target value of the battery charging rate is normally determined, for example, at 50%. The upper and lower limit values are normally determined, for example, at 20% and 80%.

These values are individually determined according to such as type and capacity of the battery and the temperature thereof. When there is a difference between the target value of the charging rate and the detection value thereof, a charging or discharging command Pcr is issued depending on the difference so as to control the detection value of the charge rate to come close to the target value. Further, when the detection value exceeds the upper limit value, the discharging command Pcr is increased to control the detection value to decrease rapidly below the upper limit value. On the other hand, when the detection value drops below the lower limit value, the battery management unit 43 issues a large charging command Pcr.

Now, a method of modifying a charging rate target value and charging rate upper and lower limit values depending on the estimated altitude information from the altitude calculation unit 44 will be explained. The altitude calculation unit 44 calculates altitudes at every moment and the battery management unit 43 stores past altitude information and calculates an average altitude value of a predetermined travelling interval up to the present position. For example, the battery management unit 43 stores altitude values at every 100 m travel and calculated average altitude for 2 km travel. Subsequently, the battery management unit 43 compares the average altitude with the present estimated altitude, and when the present altitude is higher than the average altitude, the battery management unit 43 judges that the vehicle is climbing an uphill and reduces the charging rate target value depending on the difference. For example, the charging rate target value is reduced by 10% to give 40% for an altitude difference of 100 m. However, if the target charging rate reduced excessively, the charging and discharging performance of the battery is deteriorated, therefore, the lower limit of the target value is, for example, determined at 30% so as to prevent a further lower target charging rate.

Figure 3:
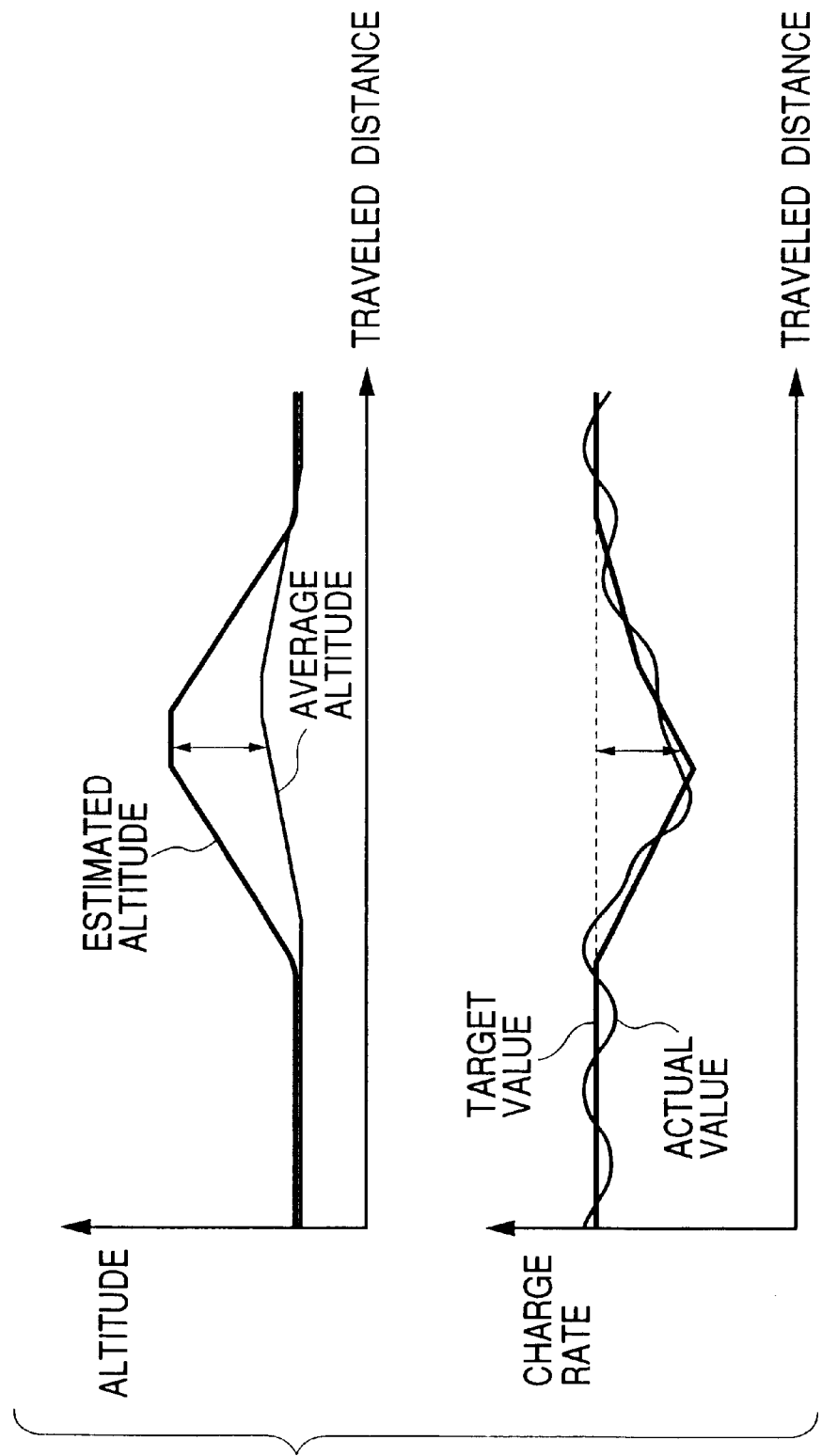
FIG. 3 is a view for explaining a charge rate variation depending on an altitude difference.

An example of modifying a target charging rate is illustrated in FIG. 3, in which a target charging rate value is reduced from a normal value depending on a difference between an estimated altitude and an average altitude. An actual charging rate varies along with a target value thereof, although the actual charging rate possibly deviates some from the target value. When the vehicle rolls a downhill, a regenerative control by the motors is activated and the battery is gradually charged up. However, according to the present invention the charging rate is reduced before the downhill, and a possible prevention of the regenerative operation due to full charging is avoided.

Figure 4:
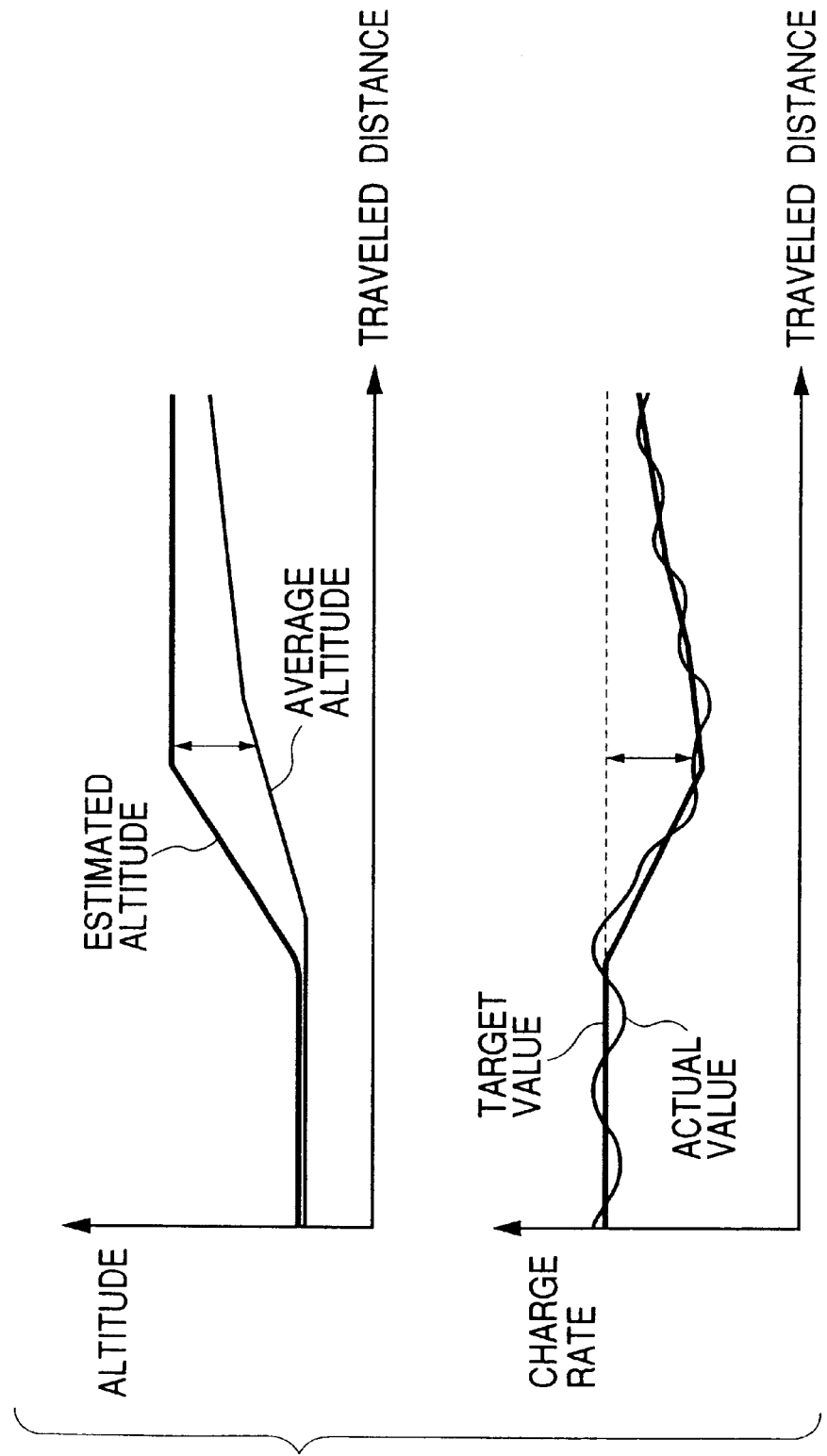
FIG. 4 is a view for explaining another charging rate variation depending another altitude difference.

Although FIG. 3 shows an example where a downhill follows immediately after an uphill, FIG. 4 shows a case where no downhill follows after an uphill for a comparatively long period. In this case, when the vehicle continues to run under the lowered charging rate, the charging and discharging performance of the battery is reduced which may lead deterioration of fuel economy as well as may cause battery life time reduction. However, according to the present invention the average altitude is gradually increased after climbing an uphill and the difference of the average altitude with the present estimated altitude value is reduced as illustrated in FIG. 4, therefore, the target charging rate also restores gradually to the original value. Accordingly, the continued travelling under the lowered charging rate is eliminated, thereby, the reductions of battery charging and discharging performance and of battery life time are prevented.

Further, in the above examples, the target value of charging rate is reduced depending on the altitude difference, however, a method of reducing an upper limit value of charging rate can also achieve like effects as above. For example, a normal upper limit charging rate of 80% is reduced to upper limit value of 70% depending on an altitude difference. Thereby, the charging rate is controlled below 70% before a downhill, the regenerated electric power is fully used to charge the battery. When a charging rate exceeds the upper limit value, a large discharge command is issued to surely control the charging rate below the upper limit value, thereby, a chargeable capacity is further effectively utilized.

Still further, in the above explanation, examples in which when the estimated altitude is higher than the average altitude, the target charging rate is reduce is illustrated, however, contrary thereto when the estimated altitude is lower than the average altitude, a method of modifying the target value in the direction of increasing the charging rate can be used. When an uphill follows after a downhill, the target charging rate is increased before the uphill, a torque assistance by the motors can be fully performed during the uphill climbing which improves in total the fuel economy. Further, when the vehicle runs through a undersea tunnel after a downhill, the target charging rate is increased before the undersea tunnel, thereby, a control, in which a priority is given to a motor drive during the tunnel travel and exhaust gas exhausting is reduced, can be performed.

Now, a method of calculating an altitude in the altitude calculation unit 44 will be explained. At first an inclination of the road concerned is estimated according to the vehicle speed and the drive torque for the vehicle. A method of estimating an inclination is, for example, disclosed in detail in JP-A-9-242862 (1997). At first, with regard to a drive torque τv for a vehicle, the following equation stands;

$$\tau v = \tau r + \tau g + \tau s \qquad (7)$$

Herein, τr represents a flat road travelling torque, τg represents an acceleration resistance torque and τs represents an inclined road torque. The flat road travelling torque τr can be calculated from a vehicle speed V according to the following equation;

$$\tau r = (\mu r \cdot W + ka \cdot V \cdot V) Rt \qquad (8)$$

Wherein, μr represents a rolling friction coefficient, W represents a weight of the vehicle, ka represents an air resistance coefficient and Rt is a dynamic radius of a wheel tire of the vehicle. Further, the acceleration resistance torque τg can be calculated according to the following equation;

$$\tau g = (W \cdot \alpha \cdot Rt)/g \qquad (9)$$

Wherein, α represents an acceleration of the vehicle and g represents a gravitational acceleration. The acceleration α can be calculated by differentiating the vehicle speed V.

Accordingly, if the vehicle speed V and the vehicle drive torque τv are determined. The inclined road torque τs can be calculated. The vehicle speed V can be calculated by multiplying the vehicle shaft revolution speed ωv by a predetermined coefficient which is determined by a gear ratio of a final gear and a radius of a wheel tire. Further, with regard to the drive torque, the drive torque can be accurately controlled by the motor control in the system as shown in FIG. 1, the torque command value τvr can be used as it is.

Further, with regard to the drive torque, a method of calculating a drive torque according to formula (4) while estimating a motor torque from a motor current can also be used. Further, alternatively, the drive torque can be determined by measuring with a torque sensor.

If the inclined road torque τs is determined, an inclination θ can be calculated by making use of the following equation;

$$\tau s = W \cdot g \cdot \sin \theta \cdot Rt \qquad (10)$$

If the inclination is calculated, a speed component in height direction corresponds to $V \cdot \sin \theta$, therefore, through integration of the speed component along time, the altitude of the vehicle can be calculated.

Through the use of the above method, an altitude can be calculated even with no information from a navigation system and can be applied for the control of the target charging rate.

Figure 5:
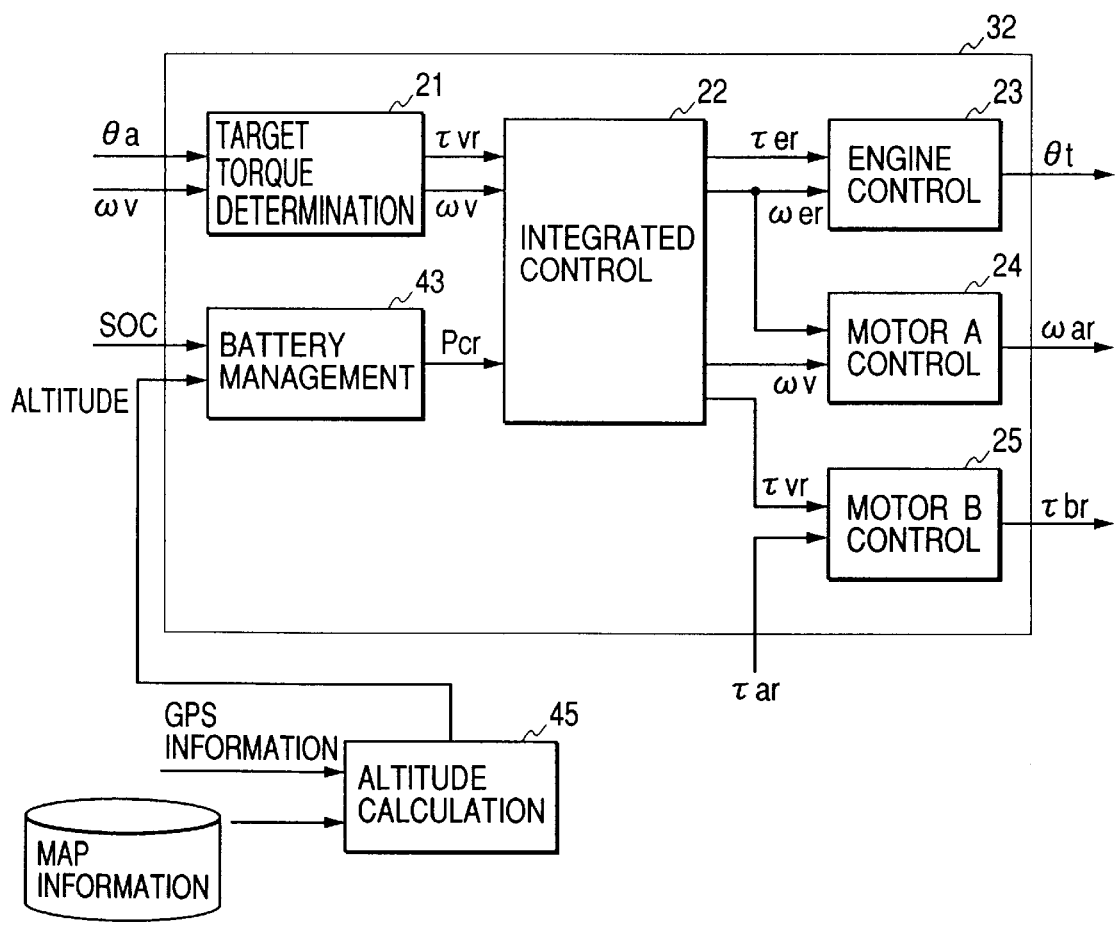
FIG. 5 is a construction diagram of another drive control device in the present invention.

Further, in a case where a vehicle is installed with a GPS global positioning navigation system, as illustrated in FIG. 5, an altitude calculation unit 45 can simply calculate an altitude by making use of GPS information and map information. However, even in a vehicle being installed with a navigation system a travelling route ahead is not necessarily set in advance, the method of controlling a target charging rate depending on variation of altitude according to the present invention is advantageous.

According to the above embodiment, even when the travelling route ahead is not designated with the navigation system, when a downhill rolling is predicted, a target charging rate of the battery is reduced, a possible regeneration prevention due to full charge is avoided and a fuel economy of a hybrid vehicle is in total improved.

What is claimed is:

1. A hybrid vehicle comprising:
an engine which generates driving energy for driving a vehicle;
a speed changer which changes revolution speed of the engine and transmits driving force to wheel tires;
an electric motor which increases or decreases driving force of the wheel tires;
a battery which supplies electric power for driving the electric motor as well as is used to be charged by regenerative electric power from the motor;
a battery management means for managing a charging rate of the battery, and
an altitude calculating means for calculating altitude of the vehicle,
wherein the battery management means is configured to set a charging rate target value or a charging rate upper limit value based on the calculated altitude information,
wherein the battery management means sets the charging rate target value or the charging rate upper limit value based a difference between an average altitude calculated according to the past altitude history and the present altitude of the vehicle.

2. A hybrid vehicle comprising:
an engine which generates driving energy for driving a vehicle;
a speed changer which changes revolution speed of the engine and transmits driving force to wheel tires;
an electric motor which increases or decreases driving force of the wheel tires;
a battery which supplies electric power for driving the electric motor as well as is used to be charged by regenerative electric power from the motor;
a battery management means for managing a charging rate of the battery, and
an altitude calculating means for calculating altitude of the vehicle,
wherein the battery management means is configured to set a charging rate target value or a charging rate upper limit value based on the calculated altitude information,
wherein the altitude calculating means calculates the. altitude based on information of driving torque and vehicle speed of the vehicle.

3. A hybrid vehicle according to claim 2, wherein the altitude calculating means uses a driving torque command value as the driving torque of the vehicle.

4. A hybrid vehicle according to claim 2, wherein the altitude calculating means estimates the driving torque of the vehicle from torque of the motor.

* * * * *